Nov. 30, 1965  G. ROOS  3,220,330
PHOTOGRAPHIC PRINTING APPARATUS
Filed May 7, 1963  3 Sheets-Sheet 1

INVENTOR.
GÜNTHER ROOS
BY Michael S. Striker
Attorney

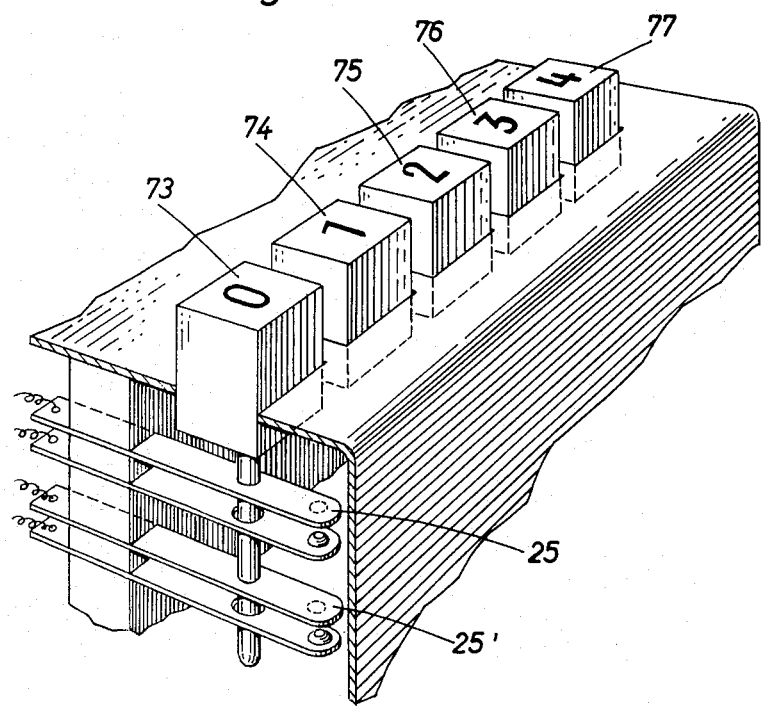

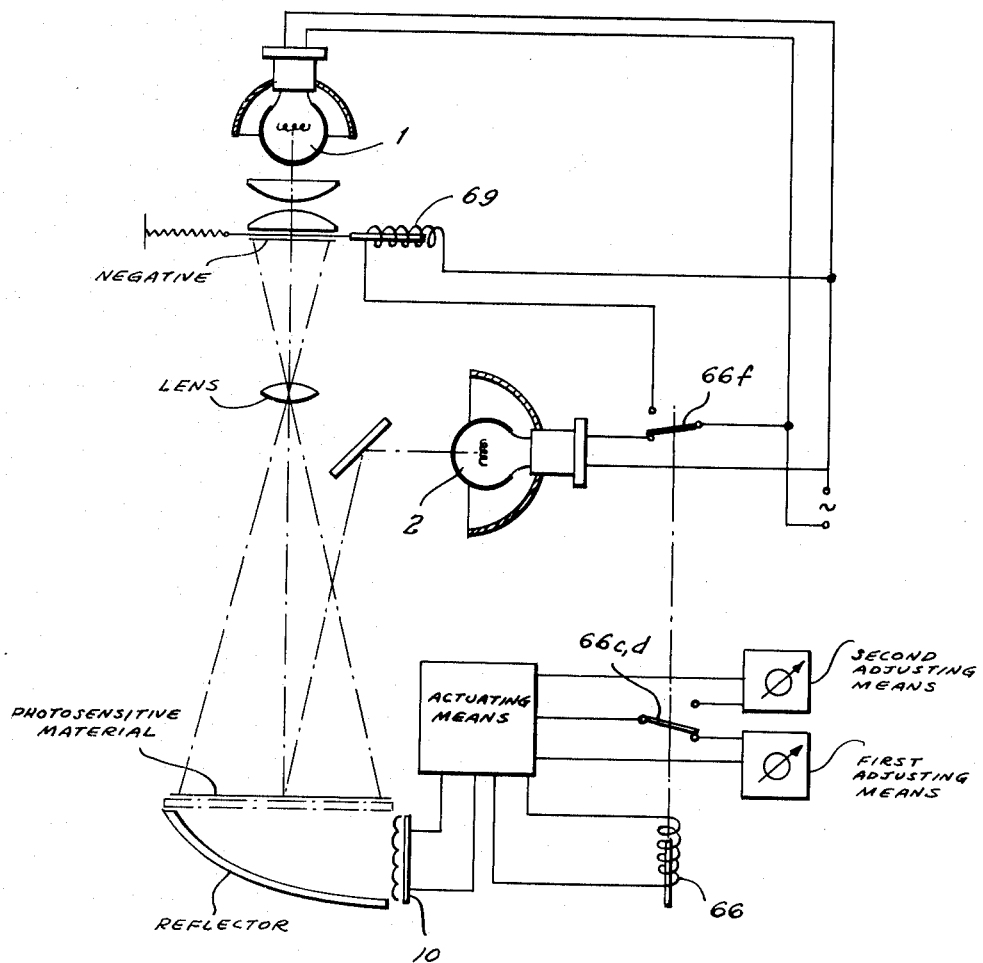

United States Patent Office 3,220,330
Patented Nov. 30, 1965

3,220,330
PHOTOGRAPHIC PRINTING APPARATUS
Günther Roos, Munich, Germany, assignor to Agfa
Aktiengesellschaft, Leverkusen, Germany
Filed May 7, 1963, Ser. No. 278,722
Claims priority, application Germany, May 10, 1962,
A 40,174
12 Claims. (Cl. 95—73)

The present invention concerns a photographic printing apparatus for exposing photo-sensitive material to light passing through a transparency, and more particularly an apparatus of this kind which is equipped with means for producing the actual printing exposure of the photo-sensitive material and with means for exposing said material to an additional advance illumination for influencing the contrast of the print, said apparatus also comprising photoelectric exposure time regulating means for automatically regulating the duration of the actual printing exposure.

Photographic printing apparatus of the above mentioned type are generally known. However, in conventional apparatus of this kind the additional advance exposure of the photo-sensitive material is not regulated by photo-electric means but is determined by a timer device which is to be set for a predetermined exposure duration. In order to make sure that during such a preset time of the additional advance exposure only a certain predetermined amount of light effecting said advance exposure impinges on the photo-sensitive mateiral, it is of utmost importance that the intensity of the light producing the advance exposure does not fluctuate during the exposure time determined by the setting of the timer. However, since unavoidable voltage fluctuations in the supply line have considerable effect on the light emission of the light source used for producing the advance exposure, the means provided for producing in conventional photographic printing apparatus the advance exposure of the photo-sensitive material had to be equipped with power supply units which include voltage-stabilizing devices. Obviously hereby the cost of the device for producing the advance exposure is considerably increased. In addition, also the actual exposure time effected by the operation of the timer is bound to differ unpredictably from the exposure time for which the timer has been set so that irregularities of operation must be expected particularly because the actual effective advance exposure time is bound to be always shorter than the time for which the timer is set because the lamp used as light source requires a certain time for heating up to lighting temperature after having been switched on.

It is therefore one object of this invention to provide for a photographic printing apparatus of the general type mentioned above, but simplified with respect to the conventional arrangements.

It is another object of this invention to provide for an apparatus as set forth in which the advance exposure time is independent of fluctuations of the voltage supply.

It is still another object of the present invention to provide for an apparatus of the type set forth in which also the advance exposure time is controlled by photoelectric means.

With above objects in view the invention includes a photographic printing apparatus for exposing photo-sensitive material to light passing through a transparency, comprising, in combination, light source means for subjecting photo-sensitive material to an advance exposure without interposition of a transparency therebetween and to a subsequent printing exposure with said transparency interposed between said light source means and said photo-sensitive material; means for starting said advance exposure; means for starting said printing exposure; means for terminating said advance exposure; means for terminating said printing exposure; actuating means for actuating said means for terminating said advance exposure after said photo-sensitive material has been exposed to a first predetermined amount of light emanating from said light source means and for actuating said means for terminating said printing exposure after said photo-sensitive material has been exposed to a second predetermined amount of light passing through said transparency; first adjusting means associated with said actuating means for adjusting within a predetermined range said first predetermined amount of light so that each advance exposure is terminated after said photo-sensitive material has been exposed to the thus adjusted first predetermined amount of light; and second adjusting means associated with said actuating means for adjusting within a predetermined range said second predetermined amount of light so that each printing exposure is terminated after said photo-sensitive material has been exposed to the thus adjusted second predetermined amount of light.

In a preferred embodiment of the invention the means for preselecting the amount of light to be used during the advance exposure comprise a voltage divider subdivided by tapping points respectively associated with different degrees of contrast and connected with the photoelectric exposure time regulating means via a switch. One of the tapping points of said voltage divider may be provided to carry such a voltage that when the automatic exposure time regulating means are connected therewith and are actuated thereafter, the latter is immediately caused by means at least indirectly responsive to said voltage to change from controlling the advance exposure to controlling the printing exposure.

Moreover, the automatic photoelectric exposure time regulating means may comprise an adjustment member provided to be used in connection with the advance exposure and a number of adjustment and correcting members which are intended to be used during the printing exposure and serve to influence the degree of sensitivity of the exposure time regulating means, said members being so connected with switch means that they are adapted to be switched on and off alternatively. The switches which serve to connect the automatic exposure time regulating means with the above mentioned voltage divider and with the adjustment and correcting members may be controlled by a common relay which is influenced by a switching-off unit forming a portion of the automatic exposure time regulating means.

The automatic exposure time regulating means comprise a timing capacitor which may be shunted temporarily by a switch also controlled by a relay in such a manner that this switch is moved to open position at the start of the advance exposure and is returned to closed position only at the end of the actual printing exposure so that said timing capacitor will maintain that charge which it reaches at the end of the advance exposure, until the subsequent start of the actual printing exposure.

It is advisable to arrange matters so that the printing exposure is started by that switching unit of the exposure time regulating means which also terminates the advance exposure. This particular switching unit may be arranged and constructed so as to be able to change for a brief moment the operating condition of the whole arrangement at the end of the advance exposure and at the end of the printing exposure, by controlling a flip-flop switch i.e. a switching device which remains in a given position reached by positive actuation until it is again positively actuated, and which serves for switching on and off the printing exposure. In particular, a special switch may be provided for applying to the automatic exposure time regulating means, upon disconnection thereof from the above mentioned voltage divider that was effective during the advance exposure, such a voltage that the above mentioned switching-off unit thereof returns to its original operative condition.

One of the advantages of the arrangement according to the invention is that the amount of light which is applied to the photo-sensitive material during the advance exposure reaches exactly a preselected value even if the intensity of the light source furnishing the illumination during the advance exposure should fluctuate during this advance exposure. Consequently, it is not necessary to supply the source of light producing the illumination during the advance exposure, with a stabilized voltage so that said source of light can be connected directly with a general voltage supply network instead of being supplied via expensive voltage stabilizing power supply units.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a partial perspective illustration of a detail of the control means in the arrangement according to FIG. 1; and FIG. 3 is a photographic printing apparatus including a photoelectric exposure time regulating arrangement according to the invention.

Figure 1:
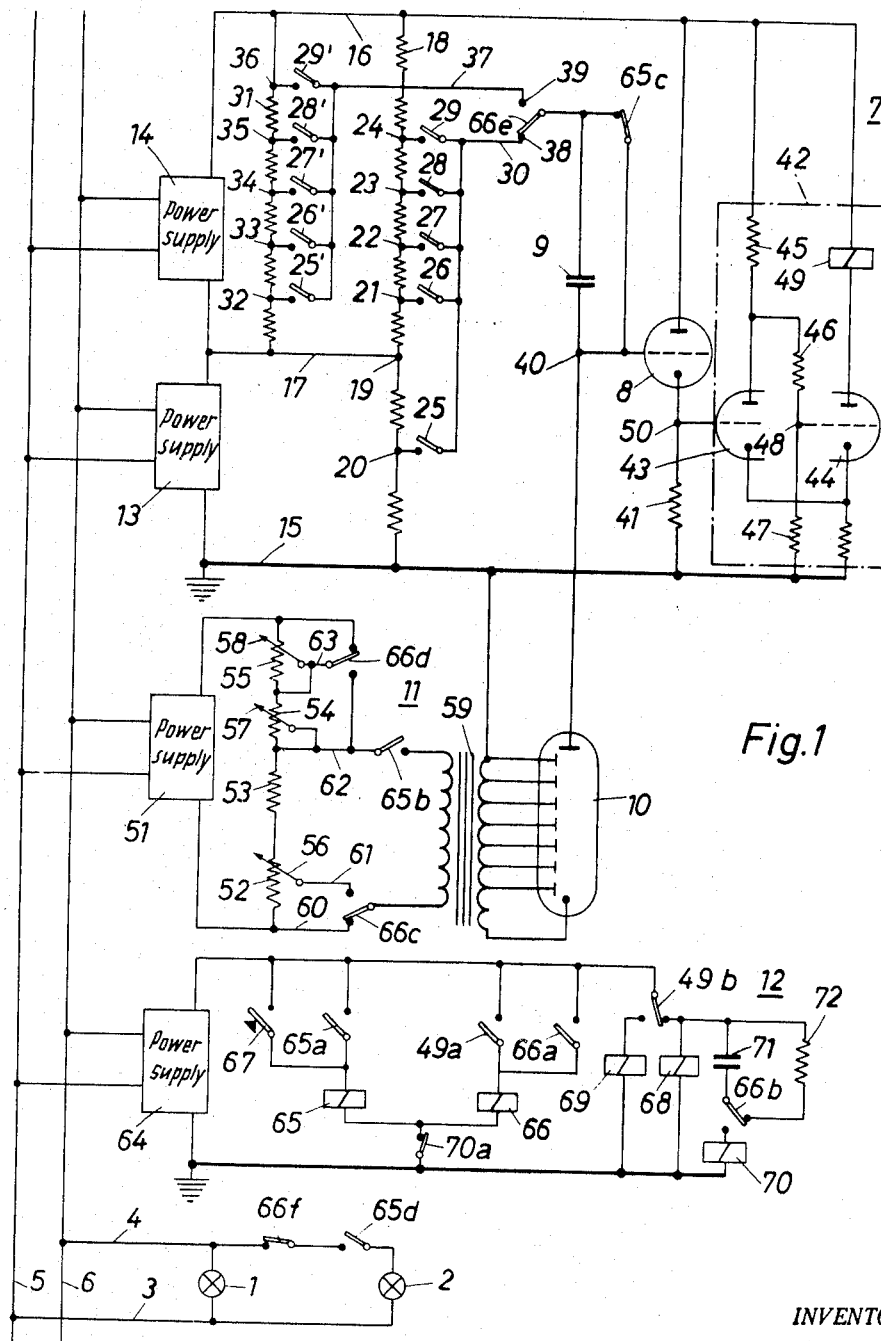
FIG. 1 is a schematic circuit diagram of an arrangement according to the invention.

FIG. 1 illustrates by way of example a combined photoelectric exposure time regulating arrangement for the photographic printing apparatus shown in FIG. 3. The apparatus shown in FIG. 3 comprises conventional means for exposing photo-sensitive material to light passing through a transparency, and also means for additionally uniformly illuminating the photo-sensitive material by means of an advance exposure taking place before the actual printing exposure and serving for varying the contrast of the printed picture. In the illustrated example two separate sources of light are provided namely in addition to the printing light source 1 also an additional second light source 2 for producing the advance exposure. Both sources 1 and 2 are connected in parallel with each other via connections 3 and 4 with a general supply network 5, 6 for alternating voltage.

The printing light source 1 may be advantageously connected during printing operations constantly with the supplying network 5, 6. Thus the source 1 need not be switched on and off for each exposure. Instead, in a conventional manner shutter means, not shown in FIG. 1, are provided between the source 1 and the photo-sensitive material, these shutter means being controlled between open and closed condition by means of electromagnets which will be described further below. However, the second source of light 2 is controlled by switches and is connected with the source of alternating voltage only for the duration of the advance exposure as will be described further below.

The combined photoelectric exposure time regulating arrangement according to the invention which serves both for controlling and printing exposure as well as the advance exposure of the photo-sensitive material comprises three circuit portions namely a control circuit arrangement 7 including a vacuum tube 8, a timing capacitor 9 and a secondary emission photo-multiplier tube 10, further a voltage supply circuit 11 for the photo-multiplier tube 10, and finally a second control circuit arrangement 12 including a plurality of relays and the electromagnetic actuating devices for the above mentioned shutter of the printing light source 1.

Two power supply units 13 and 14 connect the circuit arrangement 7 with the alternating voltage supply network 5, 6. For instance, the power supply unit 13 may be arranged to furnish a stabilized direct current voltage of 108 volts while the other power supply unit 14 may furnish a stabilized direct current voltage of 150 volts. As can be seen, the outputs of the power supply units 13 and 14 are connected in series so that in accordance with the present example a potential of 258 volts is available between the output line 16 of the supply unit 14 and the grounded output line 15 of the supply unit 13, the junction point between the units 13 and 14 being connected with an output line 17 carrying a voltage of 108 volts relative to the grounded line 15.

According to the invention a voltage divider 18 composed of a plurality of series-connected resistors and cooperating with the other portions of the arrangement during the advance exposure of the photo-sensitive material is connected between the output lines 15 and 16, a junction point 19 within the voltage divider 18 being connected with the above mentioned output line 17. A tapping point 20 carrying negative potential relative to that of the tapping point 19, as well as four other tapping points 21, 22, 23 and 24 of the voltage divider 18, the latter carrying a positive potential relative to that of the tapping point 19, are connected respectively via switch members 25, 26, 27, 28 and 29 with a common conductor 30. Between the output lines 16 and 17 a second voltage divider 31 also composed of a plurality of resistors and cooperating with the remainder of the arrangement only during the printing exposure, is arranged with five tapping points 32, 33, 34, 35 and 36 which are respectively connected via switch members 25', 26', 27', 28', and 29' with a common conductor 37.

The above mentioned conductors 30 and 37 of the voltage dividers 18 and 31, respectively, are taken to the stationary contacts 38 and 39, respectively, of a change-over switch 66e which is operated as part of a relay as described further below and is connected with the timing capacitor 9. The latter is connected at its opposite terminal with the anode of the photo-multiplier tube 10 which has a plurality of dynodes, the last one of which, nearest to the anode, is connected with the grounded output line 15. The junction point 40 between the timing capacitor 9 and the photo-multiplier tube 10 is connected with the control grid of the tube 8 which is arranged between the output lines 15 and 16 as shown, with a high resistance member 41 in series therewith.

There is further arranged between the output lines 15 and 16 a switching-off unit 42 which is constructed as a so-called Schmitt-trigger. This type of a trigger is well known and comprises a double-triode 43, 44, a voltage divider constituted by resistors 45, 46 and 47 of which resistor 45 is connected in the anode circuit of the tube portion 43 while its tapping point 48 is connected with the control grid of the tube portion 44, and a relay coil 49 arranged in the anode circuit of the tube portion 44. The junction point 50 between the cathode of the tube portion 8 and the above mentioned cathode resistor 41 is connected with the control grid of the tube portion 43.

In the illustrated embodiment the tube 8 is used as a cathode follower, the cathode potential being always e.g. two volts more positive than the potential at the control grid of the tube 8. Thus, the tube 8 acts as an impedance transformer which lowers the high resistance of that circuit sufficiently for making it possible to control the Schmitt-trigger 42 in a reliable manner.

The supply circuit 11 for the photo-multiplier 10 is connected via a suitable power supply unit 51 with the alternating voltage supply network 5, 6 and comprises a voltage divider composed of a series of resistors 52, 53, 54 and 55 of which some are adjustable by movable taps 56, 57 and 58, respectively. The primary winding of a high voltage transformer 59, the secondary of which is connected in conventional manner with the different dynodes of the multiplier tube 10, is connected with change-over switches 66c, and 66d which are relay actuated and capable of connecting the primary of transformer 59 with the outputs 60, 62 or 61, 63 of the last mentioned voltage divider, depending upon their position. The variable resistor 52 serves for adjusting the amount of the printing light impinging on the photo-sensitive material during the printing exposure, the variable resistor 54 serves for adjusting the amount of light applied to the photo-sensitive material during the advance exposure, and finally the variable resistor 55 serves for correcting the density of the print in a conventional manner.

The second control circuit 12 which is connected with the alternating voltage supply network 5, 6 by a separate power supply unit 64 comprises two relays the coils 65 and 66 whereof are connected in parallel with each other. The relay comprising the coil 65 serves for switching on the second light source 2 while the other relay serves for starting the printing exposure. The relay coil 65 is connected in series with the starting switch 67 and actuates when energized the relay switch 65a connected in parallel with the switch 67 as a holding contact, a relay switch 65b located in the primary circuit of the high voltage transformer 59, a relay switch 65c arranged to shunt in closed position the timing capacitor 9, and finally a relay switch 65d located in the supply circuit for the second light source 2. The coil 66 of the other relay is controlled by a relay switch 49a actuated by the relay coil 49 of the switching-off unit 42 and actuates when energized the relay switch 66a connected in parallel with the relay switch 49a, and the relay switch 66b located in another portion of the control circuit 12, and further the change-over relay switches 66c, 66d in the supply circuit 11, 66e in the first control circuit 7 and the relay switch 66f in the circuit of the second light source 2.

The control circuit arrangement 12 further comprises two electromagnets 68 and 69 which may be energized alternatively by a flip-flop contact 49b actuated by the above mentioned relay coil 49 in the switching-off unit 42. The first mentioned electromagnet 68 serves to close when energized the above mentioned (not shown), shutter associated with the printing light source 1, while the other electromagnet 69 serves, when energized, for opening said shutter.

If desired a relay coil 70 may be arranged in parallel with the electromagnet 68 and may be connected in series with a capacitor 71 by corresponding actuation of the change-over relay contact 66b. A resistor 72 may be arranged so as to be connected in parallel with the capacitor 71 when the relay switch 66b assumes its illustrated position. The relay coil 70 serves to control a relay switch 70a in the circuit of the relay coils 65 and 66.

In conventional manner the photo-multiplier tube 10 is arranged in a conventional manner so as to be exposed to the ilumination produced by the printing light source 1 and by the advance exposure light source 2, e.g. in accordance with U.S. Patent No. 3,034,400.

The switches 25, 25', the switches 26, 26', the switches 27, 27', the switches 28, 28' and the switches 29, 29' are actuated in pairs by push buttons 73, 74, 75, 76, 77 respectively common to them as illustrated in FIG. 2. The push buttons 73–77 serve to preselect in a particular case the exposure of the photo-sensitive material depending upon the contrast of a particular transparency and the desired contrast on the intended print. The push buttons 73–77 may be marked with symbols which indicate the stepwise increasing amount of light of the advance exposure and consequently the stepwise increasing change of contrast achievable by actuating the different push buttons, for instance the latter may be marked with the numerals 0 to 4 in which case the push button 73 carrying the symbol "0" would be associated with the advance exposure light amount "0" while the push button 77 carrying the symbol "4" would be associated with the maximum provided amount of light to be used during the advance exposure. The resistors of the voltage dividers 18 and 31 are so dimensioned that the tapping points 32–36 of the voltage divider 31 always carry a more positive potential than the corresponding tapping points 20–24 respectively, forming part of the voltage divider 18 and being coordinated or coupled with the tapping points 32–36, respectively, by the mechanical coupling of the above mentioned pairs of contacts as illustrated by way of example in FIG. 2.

In a well known manner and therefore without being so illustrated, the push buttons 73–77 are so coupled with each other that upon pressing down one of them the previously operated push button which was held locked in depressed position, is automatically released and returned by spring means or the like to its original position whereby the respectively associated pair of switches also returns to its original open position.

The operation of the arrangement according to the invention as described and illustrated is as follows:

At the start or in idle condition all the switch members of the illustrated arrangement assume the positions as illustrated. All the relays of the exposure time regulator arrangement are under these circumstances de-energized. The printing light source 1 is switched on but the closing electromagnet 68 of the associated shutter is in energized condition and thus holds the shutter in closed position so that an exposure of the photo-sensitive material through the source 1 cannot take place. The second advance exposure light source 2 is switched off.

By actuating one of the push buttons 73–77 the operator may preselect that degree of advance light adjustment which he feels corresponds to the contrast of the transparency in question. It may be assumed that in a particular case the push button 75 is to be actuated. When this is done the switch contacts 27 and 27' are moved to closed position whereby the potential at the tapping point 22 of the voltage divider 18 is applied to both electrodes of the timing capacitor 9 which at this moment is still shunted by the closed relay switch contact 65c. By thus selecting this particular potential available at the tapping point 22 a predetermined amount of advance exposure light is preselected as will be explained further below.

If now after this preselection the automatic photo-electric exposure time regulating arrangement is started, first the advance exposure of the photo-sensitive material is started thereby and controlled, and at the end of the advance exposure automatically the actual printing exposure is started and also controlled regarding its duration.

For starting the operation of the exposure time regulator the starting switch 67 is moved to closed position whereby the relay coil 65 is energized. Hereby the relay switches 65a, 65b, 65d are moved to closed position while the relay switch 65c is moved to open position. By the closing of the relay switch 65a in the second control circuit 12 the relay coil 65 remains energized even after the starting switch 67 has been released or moved back to open position, while the closing of the relay switch 65b in the supply circuit 11 causes the voltage existing between the output lines 60 and 62 of the pertaining voltage divider to be applied to the primary winding of the high voltage transformer 59. This voltage is selected only for the advance exposure by the setting of the movable tap 57 along the adjusting resistor 54. On the other hand, the primary voltage of the transformer 59 is predetermined for the printing exposure of the photo-sensitive material only by the settings of the movable taps 56, 58 along the adjusting resistor 52 and along the still shunted density correction resistor 55, respectively. By the movement of the relay switch 65c to open position the shunting of the timing capacitor 9 is terminated, and by the movement of the relay switch 65d to closed position the advance exposure light source 2 is switched on so that now the exposure of the photo-sensitive material and of the photo-multiplier tube 10 to the light furnished by the second source 2 is started.

Under the action of the photo-current furnished by the photo-multiplier tube 10 the timing capacitor 9 is now charged with the effect that the grid potential of the tube 8 and consequently also its cathode potential as well as the grid potential of the initially current carrying tube portion 43 drops while as a result of this the grid potential of the tube portion 44 rises. As soon as the cathode potential of the tube 8 reaches a value substantially equal to that of the potential at the junction point 48, the tube portion 44 which originally did not carry any current, will suddenly start to carry current and thus energize the relay coil 49. At this moment the advance exposure is terminated since a preselected amount of light (in accordance with the selected control potential at the tapping point 22) has been applied from the source 2 to the photosensitive material and has been measured by the photo-multiplier tube 10.

The energization of the relay coil 49 causes closing of the relay switch 49a and a change of position of the change-over switch contact 49b. Thus the shutter closing electromagnet 68 is de-energized and the shutter opening electromagnet 69 is energized so that now the not illustrated shutter located across the beam of the printing light source 1 is opened and the printing exposure of the photo-sensitive material is started. At the same time the relay coil 66 is energized by the closing of the relay switch 49a whereby the relay switch 66a of the control circuit 12 is closed, the change-over switches 66b of circuit 12, the change-over switches 66c, 66d of the supply circuit 11 and the change-over switch 66e of the first control circuit 7 are moved to their respective second position while at the same time the relay switch 66f is moved to open position. Consequently, the second source of light 2 is switched off and thus the advance exposure of the photo-sensitive material is interrupted. However, by the change of position of the change-over relay switches 66c and 66d the primary winding of the high voltage transformer 59 is now connected with the output lines 61, 63 of the voltage divider in the supply circuit arrangement 11, and hereby the variable resistor 54 which was effective during the advance exposure is now shunted by the switch 66d. On the other hand, the adjusting resistor 52 for the printing exposure and the density correcting resistor 58 are now rendered operative in a manner depending upon how they had been previously set.

Moreover, by the above mentioned change of position of the relay change-over switch 66e the one terminal of the timing capacitor 9 is disconnected from the tapping point 22 of the voltage divider 18 and instead connected with the tapping point 34 of the voltage divider 31 whereby the grid voltage of the tube 8 and consequently also its cathode potential are raised an amount equal to the potential difference between the voltage divider tapping points 34 and 22. The sudden rise of the cathode potential of tube 8 causes the tube portion 43 again to carry current while the tube portion 44 and the relay coil 49 are left without current. The resulting movement of the relay switch 49a to open position remains without any effect on the relay coil 66 because the latter holds itself energized through its relay contact 66a. The flip-flop contact 49b is not returned to its previous position by the de-energization of the coil 49 but remains in the position caused by the previous energization of the relay coil 49.

Since the relay coil 65 remains in energized condition through its holding contact 65a, and consequently also the relay contact 65c remains in open position, the timing capacitor keeps at this moment i.e. even after termination of the advance exposure, that electric charge which it has obtained during the advance exposure. During the now following printing exposure of the photo-sensitive material the photo-multiplier tube 10 is also illuminated by the light effecting the printing exposure. The hereby produced photo-current causes a further charge of the timing capacitor 9 so that the grid voltage of the tube 8 and consequently also its cathode potential again drop and cause again energization of the relay coil 49 as soon as the cathode potential of the tube 8 reaches the corresponding critical value. The renewed energization of the relay coil 49 causes first again closing of the shunted relay switch 49a and return of the flip-flop contact 49b to its original position whereby the shutter opening electromagnet 69 is de-energized and the shutter closing electromagnet 68 is again energized. Consequently the shutter controlling the beam from the printing light source 1 is again closed and the printing exposure of the photo-sensitive material is now terminated.

At the same time the relay coil 70 receives via the switch 49b returned to its original position a brief current impulse across the capacitor 71 which is at the same time charged, so that now the relay switch 70a is moved to open position for a brief interval. Hereby the relay coils 65 and 66 are de-energized and consequently all the relay switches controlled thereby return to their respective original positions. This applies also to the relay switches 66b and 65c so that now the capacitor 71 as well as the timing capacitor 9 are both discharged through the respective shunt circuit. The grid and cathode voltage of the tube 8 rise suddenly again whereby the relay coil 49 is again de-energized. Hereby the switch 49a is again moved to open position while the flip-flop contact 49b remains in the illustrated position. The relay comprising the coil 70 and the switch 70a is a delayed action relay so that the switch 70a closes again only after the relay switch 49a has been moved to open position.

The entire automatic switching operation is now terminated. The entire exposure time regulating arrangement is again in its starting position and ready for another printing operation. Should it be necessary to choose for the next printing operation a different amount of light for the advance exposure then a different push button is to be actuated and the previously actuated push button 75 is automatically returned to its idle position together with the switches 27, 27' controlled thereby.

If it is desired to carry out a printing operation without any advance exposure of the photo-sensitive material then it is necessary to actuate the push button 73. In this case the switches 25 and 25' are moved to closed position whereby the grid potential and the cathode potential of the tube 8 assume immediately values which are below the critical values required for the energization of the relay coil 49. This means that upon closing of the starting switch 67 immediately the relay coil 49 is energized so that an advance exposure of the photo-sensitive material is not carried out and immediately the printing exposure of the photo-sensitive material is started.

Since the advance exposure of the photo-sensitive material is controlled by the photoelectric automatic exposure time regulating arrangement and is exactly terminated when a predetermined and preselected amount of light has been applied to the photo-multiplier 10 and consequently a predetermined amount of light has been applied during the advance exposure to the photo-sensitive material, this selected and desired amount of light applied during the advance exposure is independent of variations or fluctuations of the light intensity which may for instance be caused by fluctuations of the alternating voltage in the supply network 5, 6.

Since the charge of the timing capacitor 9 effected during the advance exposure of the photo-sensitive material is not removed at the beginning of the printing exposure of the photo-sensitive material assurance exists that the total sum of the amount of light applied during the advance exposure and the amount of light applied during the printing exposure reaches the exact amount desired for correctly and properly exposing the photo-sensitive material for the purpose of printing a particular image from a given transparency.

Theoretically it would be possible to arrange matters so that during a printing operation the amount of light applied to the photo-sensitive material is kept at a constant value irrespective of what amount of light is applied to the photo-sensitive material during the advance exposure. This could be arranged by omitting the tapping points 32, 33, 35 and 36 of the voltage divider 31 and by connecting the conductor 37 permanently and directly to the tapping point 34 of the voltage divider 31, thus also omitting the switches 25'-29'. However experience has shown that better prints are obtained if prints are made from low-contrast transparencies with a smaller amount of printing light, and from high-contrast transparencies with a greater amount of printing light. This is taken into consideration in the embodiment according to the invention by providing means for connecting the conductor 37 with the different tapping points 32-36 of the votlage divider 31 by means of the switches 25'-29'. Since however the use of an advance exposure is ordinarily not or only to a small degree required when printing from low-contrast transparencies, but always necessary to a considerable degree in the case of printing from high-contrast transparencies, it has been found highly advisable to couple the switches 25-29 with the switches 25'-29'. As a result, during operation of this arrangement the total amount of light which is applied to the photo-sensitive material in the case of printing from transparencies having an extremely high contrast may differ to a greater degree from the mean value of the available amount of light which furnishes very good results when transparencies of medium contrast are used, than the required amount of light during advance exposure would differ from that value which is necessary for advance exposure in the case of a transparency of medium contrast.

The above described embodiment of the invention may be modified and varied in various respects. For instance, the push button arrangement 73-77 according to FIG. 2 may be operatively connected with the starting switch 67 so that the latter is actuated immediately together with the selection of the degree of advance exposure.

If desired, the number of push buttons 73-77 and of the switches actuated thereby may be changed, e.g. there may be more than five push buttons and correspondingly more than five switch pairs 25, 25'-29, 29' in connection with the voltage dividers 18 and 31, respectively. Instead of push buttons 73-77 cooperating with the switch pairs 25, 25'-29, 29' a rotary selector switch may be provided which has a plurality of contacts cooperating analogously with the voltage dividers 18 and 31, respectively.

Instead of the tube 8 used as a cathode follower together with a Schmitt-trigger 42, as described and illustrated, the exposure time regulating arrangement may be also equipped with a thyratron cooperating with relays.

It should be noted that the arrangement according to the invention is also applicable to an apparatus in which the amount of light for the advance exposure is not adjusted and preselected by manual operation, but is automatically predetermined and adjusted by means of a known arrangement which scans the transparency for measuring its contrast characteristics, as described for instance in the U.S. Patent No. 3,034,400.

If desired, the amount of light used during the advance exposure and the amount of light used during the printing exposure may also be measured by two separate photocells in parallel connection instead of the single photo-multiplier 10 described above, one of said photocells being arranged across the beam of light used for the advance exposure and the other photocell being arranged across the beam used during the printing exposure.

It will be understood that each of the elements described above, or two or more together, may also find a useful application in other types of photoelectric exposure time regulating means differing from the types described above.

While the invention has been illustrated and described as embodied in combined photoelectric exposure time regulating means for automatically regulating the printing exposure and also the duration of an advance exposure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic printing apparatus, in combination, light source means adapted to provide an advance exposure and a subsequent printing exposure of a photo-sensitive material; means for starting said advance exposure; means for starting said printing exposure; means for terminating said advance exposure; means for terminating said printing exposure; actuating means including photoelectric means exposed to light from said light source means during said advance and printing exposures respectively, for actuating said means for terminating said advance exposure after said photo-sensitive material has been exposed to a first predetermined amount of light emanating from said light source means, for actuating said means for starting said printing exposure and for actuating said means for terminating said printing exposure after said photo-sensitive material has been exposed to a second predetermined amount of light, said photoelectric means including first sensitivity adjustment means provided for adjusting the sensitivity thereof during said advance exposure and second sensitivity adjustment means provided for adjusting the sensitivity thereof during said printing exposure, and control switch means cooperating with said means for terminating said advance exposure and for starting said printing exposure and changeable between a first position in which said first sensitivity adjustment means are rendered operative and a second position in which said second sensitivity adjustment means are rendered operative; first adjusting means associated with said actuating means for adjusting within a predetermined range said first predetermined amount of light so that each advance exposure is terminated after said photo-sensitive material has been exposed to the thus adjusted first predetermined amount of light; and second adjusting means associated with said actuating means for adjusting within a predetermined range said second predetermined amount of light so that each printing exposure is terminated after said photo-sensitive material has been exposed to the thus adjusted second predetermined amount of light.

2. In a photographic printing apparatus, in combination, light source means adapted to provide an advance exposure and a subsequent printing exposure of a photo-sensitive material; means for starting said advance exposure; means for starting said printing exposure; means for terminating said advance exposure; means for terminating said printing exposure; actuating means including photoelectric means exposed to light from said light source means during said advance and printing exposures, respectively, for actuating said means for terminating said advance exposure after said photo-sensitive material has been exposed to a first predetermined amount of light emanating from said light source means, for actuating said means for starting said printing exposure and for actuating said means for terminating said printing exposure after said photo-sensitive material has been exposed to a second predetermined amount of light, said photoelectric means including first sensitivity adjustment means provided for adjusting the sensitivity thereof during said advance exposure and second sensitivity adjustment means provided for adjusting the sensitivity thereof during said printing exposure, and control switch means cooperating with said actuating means for adjusting within a predeter- and for starting said printing exposure and changeable between a first position in which said first sensitivity adjustment means are rendered operative and a second position in which said second sensitivity adjustment means are rendered operative; first adjusting means associated with said actuating means for adjusting within a predetermined range said first predetermined amount of light so that each advance exposure is terminated after said photosensitive material has been exposed to the thus adjusted first predetermined amount of light, said first adjusting means including voltage divider means having a plurality of tapping points respectively associated with different selectable values of said first predetermined amount of light additional control switch means cooperating with said means for terminating said advance exposure and for starting said printing exposure, and a plurality of selector switches for selectively connecting any one of said tapping points with said additional control switch means, the latter serving to connect said voltage divider means with said actuating means; and second adjusting means associated with said actuating means for adjusting within a predetermined range said second predetermined amount of light so that each printing exposure is terminated after said photo-sensitive material has been exposed to the thus adjusted second predetermined amount of light.

3. An apparatus as claimed in claim 2, wherein said actuating means and said voltage divider means are so constructed that when a particular selected one of said tapping points is connected with said actuating means an actuation of said means for starting said advance exposure causes said actuating means to actuate immediately said means for starting said printing exposure.

4. An apparatus as claimed in claim 2 wherein said actuating means include electric control means for jointly actuating said means for terminating said advance exposure and said means for starting said printing exposure, and relay means energizable by said electric control means and actuating when energized all of said control switch means.

5. An apparatus as claimed in claim 4, wherein said photoelectric means include timing capacitor means which are charged in proportion to the amount of light to which said photoelectric means are exposed during said advance and printing exposures, respectively, and relay switch means controlled by said means for starting said advance exposure and including a relay switch normally shunting said timing capacitor but moved to open position upon energization of said relay switch means at the start of said advance exposure and held in said open position until termination of said printing exposure so that said timing capacitor will maintain that charge which it has acquired up to the termination of said advance exposure unchanged until the start of the subsequent printing exposure.

6. An apparatus as claimed in claim 5, wherein said means for starting said printing exposure and said means for terminating said printing exposure are jointly comprised by a flip-flop contact means controllable by said electric control means of said actuating means, said electrical control means actuating said flip-flop contact means at the end of said advance exposure so as to assume a position causing the start of said printing exposure and actuating said flip-flop contact means at the end of said printing exposure so as to assume a position causing termination of said printing exposure.

7. An apparatus as claimed in claim 6, including means for causing said electric control means of said actuating means to return to its normal operative condition when said voltage divider means are disconnected from said actuating means by operation of said first mentioned control switch means.

8. An apparatus as claimed in claim 7, wherein a plurality of push buttons is provided for actuating selectively said selector switches, respectively.

9. An apparatus as claimed in claim 7, wherein said light source means comprise a first light source for producing said advance exposure and a second light source for producing said printing exposure.

10. An apparatus as claimed in claim 7, wherein said second adjusting means include second voltage divider means having a plurality of second tapping points and a plurality of second selector switches for selectively connecting any one of said second tapping points with said additional control switch means, said second tapping points being respectively associated with different values of said second predetermined amount of light.

11. An apparatus as claimed in claim 10, wherein said selector switches of said first adjusting means are respectively coupled in pairs with corresponding ones of said second selector switches for simultaneous actuation.

12. An apparatus as claimed in claim 11, wherein a plurality of push buttons is provided for jointly actuating selectively said pairs of selector switches.

References Cited by the Examiner
UNITED STATES PATENTS
2,857,555   10/1958   Koen et al. _____ 95—73 X FOREIGN PATENTS
702,599   1/1954   Great Britain.
829,999   3/1960   Great Britain.

EVON C. BLUNK, Primary Examiner.